United States Patent [19]

Schmidgall

[11] 3,707,776
[45] Jan. 2, 1973

[54] CONTROL MEANS FOR AN INDUCTANCE MEANS

[75] Inventor: Phillip L. Schmidgall, Indianapolis, Ind.

[73] Assignee: P. R. Mallory & Co. Inc., Indianapolis, Ind.

[22] Filed: Feb. 10, 1971

[21] Appl. No.: 114,140

[52] U.S. Cl.................................................34/45, 34/55
[51] Int. Cl.................................................F26b 13/10
[58] Field of Search ...............34/45, 48, 55; 318/483

[56] References Cited

UNITED STATES PATENTS

| | | | |
|---|---|---|---|
| 2,257,158 | 9/1941 | Cooley | 318/166 |
| 2,415,022 | 1/1947 | Morrison | 318/171 |
| 2,435,423 | 2/1948 | Clapp | 318/231 X |
| 3,491,458 | 1/1970 | Elders et al. | 34/55 X |
| 3,521,376 | 7/1970 | Beller | 34/45 |
| 3,540,131 | 11/1970 | Kahale | 34/45 |
| 3,613,254 | 10/1971 | Smith | 34/45 |

Primary Examiner—Carroll B. Dority, Jr.
Attorney—Richard H. Childress, Robert F. Meyer and Henry W. Cummings

[57] ABSTRACT

A resonant control means causes the voltage and current of an inductance drive means to be out of phase with each other so as to prevent operation of the inductance drive means.

8 Claims, 1 Drawing Figure

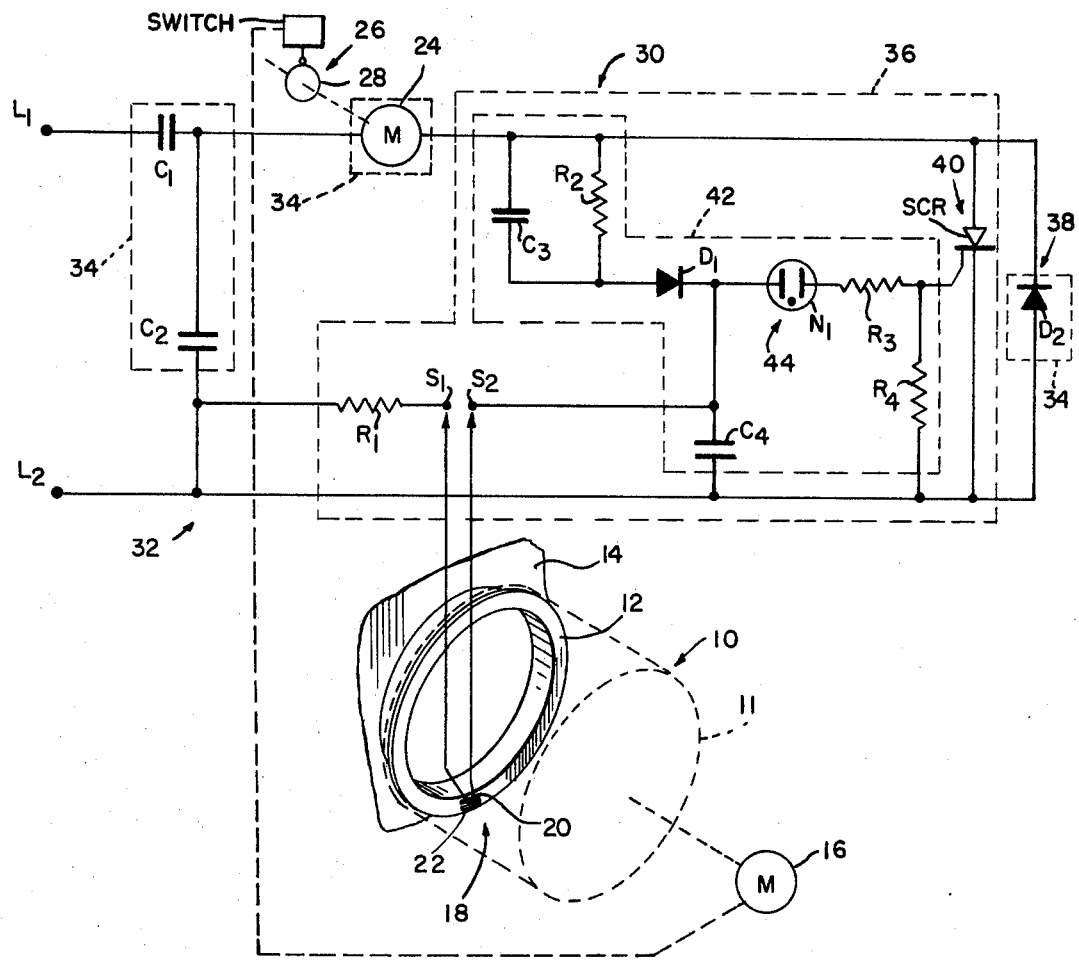

1

CONTROL MEANS FOR AN INDUCTANCE MEANS

This invention relates to a control means; more particularly, it relates to a control means which selectively energizes and de-energizes an inductance means such as a synchronous motor. The invention is particularly useful in selectively energizing and de-energizing the motor of an automatic clothes dryer.

The tumbling mechanism of an automatic clothes dryer is usually driven by a suitable motor. The on-off operation of such a motor is usually controlled by a cam programming means which is driven by a timer motor. A sensing means is provided to sense an operating condition of the dryer such as the humidity in the tumbling mechanism which in turn regulates the on-off operation of the timer motor to which the cam programming means is responsive. Energizing the timer motor operates the cam programming means which turns off the dryer motor and thus stops rotation of the tumbling mechanism of the dryer. Conversely, when the timer motor is turned off, the dryer motor is allowed to operate under certain conditions.

The present invention is concerned with a control means which includes an electrical circuit coupling the clothes dryer to the timer motor such that the timer motor's on-off operation can be controlled in response to an operating condition of the dryer. In the present state of the art of timing mechanisms, the motor driving the timing mechanism is usually of the synchronous motor type. A synchronous motor being an inductance means, the invention, in a more broader aspect, relates to control means which includes an electrical circuit which operates or controls the on-off operation of an inductance means.

It is, therefore, an object of the invention to provide a control means which controls the on-off operation of an inductance means.

It is another object of the invention to provide a control means to control the on-off operation of an inductance means which includes an electrical circuit providing a resonant means which when energized causes the voltage-current phase relationship of the inductance means to be out of phase in relation to each other such that the inductance means does operate.

Still another object of the invention is to provide a resonant means which when energized controls the voltage-current phase relationship of an inductance means in the resonant means, the resonant means further including two capacitors connected in series, with the inductance means connected in parallel with one of the capacitors, and a control means connected in series with the inductance means.

Another object of the invention is to provide a control means which includes an electrical circuit having a resonant means and an electrical current control phase means which cooperates with the resonant means to selectively energize and de-energize the resonant means.

Still another object of the invention is the provision of a control means controlling the operation of an inductance means which includes an electrical circuit providing a resonant means and an electrical current phase control means cooperating with the resonant means, the electrical current phase control means including an electronic switching means.

Still another object of the invention is the provision of the combination of a motor driven dryer, a synchronous timer motor through which a cam programming means controls the on-off operation of the motor for the dryer, and a control means selectively energizing the timer motor, the control means with said timer motor including a resonant means which selectively causes the voltage and current of the timer motor to be out of phase with each other so as to prevent operation of the timer motor.

These and other objects of the invention will become apparent from the following description taken in conjunction with the accompanying drawing wherein there is depicted a wiring diagram of the control means of the present invention shown in conjunction with the tumbling mechanism of an automatic clothes dryer.

Generally speaking, the objects of the invention are accomplished by providing in combination an a resonant means including an inductance means, and a means selectively energizing and de-energizing the resonant means, energizing the resonant means causing the voltage and current of the inductance means to be out of phase with each other so as to prevent operation of the inductance means. The resonant means is part of an electrical circuit and includes two capacitors connected in series, with the inductance means connected in parallel with one of the capacitors and a control means such as a diode connected in series with the inductance means. Also included as part of the electrical circuit is an electrical current phase control means which includes a switching means such as a silicon controlled rectifier and a biasing means which in conjunction with a sensing means regulates the voltage to the switching means. The sensing means may be connected to a suitable appliance such as an automatic clothes dryer to automatically control the on-off operation of the dryer.

Referring now to the drawing, there is shown portions of an automatic clothes dryer, namely, tumbling means 10 which includes a drum 11 rotatably carried by a mounting rim 12. Mounting rim 12 is carried by a suitable frame 14 of the clothes dryer. The tumbling means 10 is rotatably driven through a suitable motor 16. The clothes to be dried are tumbled in the tumbling means 10. An operating condition of the dryer, such as the humidity inside the tumbling means, is sensed through sensing means 18. Sensing means 18 includes sensor elements $S_1$ and $S_2$ carried on the rim through suitable means such as electrically insulative support means 20 and 22. Suitable sensing elements would include plated electrodes, for example. A timer motor 24 rotatably drives a cam programming means 26 which includes at least one cam 28 and an electrical switch responsive to the cam. As will be hereinafter described, the on-off operation of the motor 16 is responsive to the cam means 26 through the switch that is driven by the timer motor 24. The on-off operation of the timer motor 24 is controlled through control means 30 which includes an electrical circuit 32. Electrical circuit 32 includes resonant means 34 and electrical current phase control means 36, sensing means 18 being included as part of the electrical current phase control means. The resonant means 34, when energized, will, as hereinafter described, cause the voltage and current of the motor 24 to be out of phase with each other so as to prevent operation of the motor. The resonant means includes capacitors $C_1$ and $C_2$ connected in series between terminals $L_1$ and $L_2$ with motor 24 being connected in parallel with capacitor $C_2$ and a control means 38 connected in series with the motor 24. Control means 38 includes diode $D_2$. Terminals $L_1$ and $L_2$ may be connected to any suitable AC power source. Electrical current phase control means 36 includes a switching means 40, a biasing means 42 and sensing means 18. Biasing means 42 includes resistor $R_2$ in series with diode $D_1$ which is in series with triggering means 44 which is in series with resistors $R_3$ and $R_4$ in combination with capacitor $C_4$ which activates the trigger means 44. Capacitor $C_3$ is connected in parallel across resistor $R_2$. This series combination is connected from one end of the motor 24 to the line $L_2$. Triggering means 44 includes a neon lamp $N_1$. Switching means 40 includes a silicon controlled rectifier (SCR) which is connected anode to motor, cathode to the line, and gate to the junction of $R_3$ and $R_4$. To complete the description, resistor $R_1$ is in series with sensing elements $S_1$ and $S_2$, this combination being in parallel with capacitor $C_4$. Diode $D_2$ is connected in series to motor 24, cathode to motor and anode to line $L_2$, the combination being in parallel with capacitor $C_2$.

In operation, assume that wet clothes are placed in drum 11 of the dryer. The humidity in the drum is sensed by sensing elements $S_1$ and $S_2$. The wet clothes in the dryer keep capacitor $C_4$ from charging; thus keeping neon tube $N_1$ from conducting which in turn keeps SCR from conducting. In this condition, $C_1$ and $C_2$ are in series across the line $L_1$ and $L_2$, the motor 24 is in series with diode $D_1$, both being in parallel with $C_2$. On the first positive half cycle, $C_1$ and $C_2$ are charged while no current flows through the motor 24 due to the diode $D_1$. On the negative half cycle, $C_1$ and $C_2$ are discharged and recharged in the opposite direction and current flows through the motor 24. However, current lags voltage in an inductance means such as a synchronous motor and leads voltage in a capacitor. Therefore, the current through the motor 24 and capacitance are out of phase causing the voltage across the motor to be nearly zero. With capacitor $C_1$ included in the circuit, the voltage across the motor 24 becomes zero due to the additional lead of current with respect to voltage in $C_1$.

As the clothes become dryer, the electrical resistance of the clothes increases. When the resistance of the clothes becomes sufficiently high (greater than approximately 80,000 ohms, for example), capacitor $C_4$ will charge on the positive half voltage cycle through capacitor $C_1$, motor 24, resistor $R_2$ and diode $D_1$. When the voltage across capacitor $C_4$ becomes large enough, neon lamp $N_1$ will start conducting through resistor $R_3$ and $R_4$. The current through resistor $R_4$ will produce a voltage at the gate of the SCR which will cause the SCR to conduct in the forward direction for the remainder of the positive half cycle. During the negative half cycle, diode $D_2$ conducts. When the SCR and diode $D_2$ are conducting, approximately 300° of the 360° electrical degress of voltage appear across the motor 24 and the motor will run. Capacitor $C_3$ increases the power delivered by the motor when the motor is in the running condition. The synchronous motor 24 will turn the cam programming means which will turn off the dryer motor.

I claim:

1. In combination, a motor driven dryer, a synchronous motor and cam programming means responsive to said synchronous motor, said cam programming means in cooperation with switch means selectively energizing and de-energizing said dryer motor, and an electrical circuit comprising:

a. terminal means connecting said electrical circuit to an alternating current power source,
   b. resonant means including said synchronous motor,
   c. electrical current phase control means cooperating with said resonant means including sensing means responsive to an operating condition of said dryer, energizing said electrical current phase control means energizing said resonant means and causing the voltage-current phase relationship of said synchronous motor to be out of phase relation to each other such that said synchronous motor does not operate.

2. The combination according to claim 14 wherein said resonant means further includes at least two capacitors connected in series between said terminal means, said synchronous motor connected in parallel with one of said capacitors and a control means connected in series with said synchronous motor.

3. The combination according to claim 2 wherein said control means is a diode.

4. The combination according to claim 14 wherein said electrical current phase control means includes a switching means, a biasing means, said sensing means regulating the voltage to said switching means.

5. The combination according to claim 4 wherein said sensing means includes electrode means disposed in a drum of said clothes dryer and a current limiting means in series with said electrode means.

6. The combination according to claim 4 wherein said biasing means includes a series combination of resistors, diode means and trigger means in combiantion. with a capacitor to activate said trigger means.

7. The combination according to claim 6 wherein said trigger means includes a neon light.

8. The combination according to claim 4 wherein said switching means includes a silicon controlled rectifier.

* * * * *